United States Patent [19]

Lawrence

[11] 4,339,973

[45] Jul. 20, 1982

[54] METHOD AND APPARATUS FOR CUTTING ELECTRICAL OUTLET OPENINGS IN PANELS

[76] Inventor: Robert L. Lawrence, 54 Tim St., Pontiac, Mich. 48054

[21] Appl. No.: 144,641

[22] Filed: Apr. 28, 1980

[51] Int. Cl.³ .............................................. G01B 3/14
[52] U.S. Cl. .......................................... 83/30; 83/39; 83/55; 30/161; 33/DIG. 10
[58] Field of Search ............... 33/DIG. 10; 83/50, 55, 83/30, 39; 30/358-361, 366-368

[56] References Cited

U.S. PATENT DOCUMENTS

| | | | |
|---|---|---|---|
| 3,381,376 | 5/1968 | Ames | 30/358 |
| 3,745,664 | 7/1973 | Altseimer | 33/DIG. 10 |
| 3,888,013 | 6/1975 | Benoit | 33/DIG. 10 |
| 4,059,905 | 11/1977 | Wieting | 33/DIG. 10 |

Primary Examiner—James M. Meister
Attorney, Agent, or Firm—Paul H. Gallagher

[57] ABSTRACT

A device for use in applying panels to a wall, for providing holes in the panels to expose electrical outlets and switches therethrough. The device includes two components, a box and a cutter plate; the box is fitted to an outlet or switch, that is in position in the wall, and has pins and a peripheral cutting edge directed outwardly when the box is so fitted. The wall panel to be put on the wall is tentatively set in place, bearing against the pins, and is then tapped to drive the pins into and through the panel. The panel is then removed from such tentative position, carrying the box with it, by means of the pins friction-holding in the holes, and laid on the floor with the box down. The cutter plate is then fitted on the pins which are exposed through the panel, applied to the upper surface of the panel, and struck with a hammer, forcing the panel against the peripheral cutting edge of the box, cutting through the panel and leaving a hole therein of the size, shape and location of the box.

9 Claims, 8 Drawing Figures

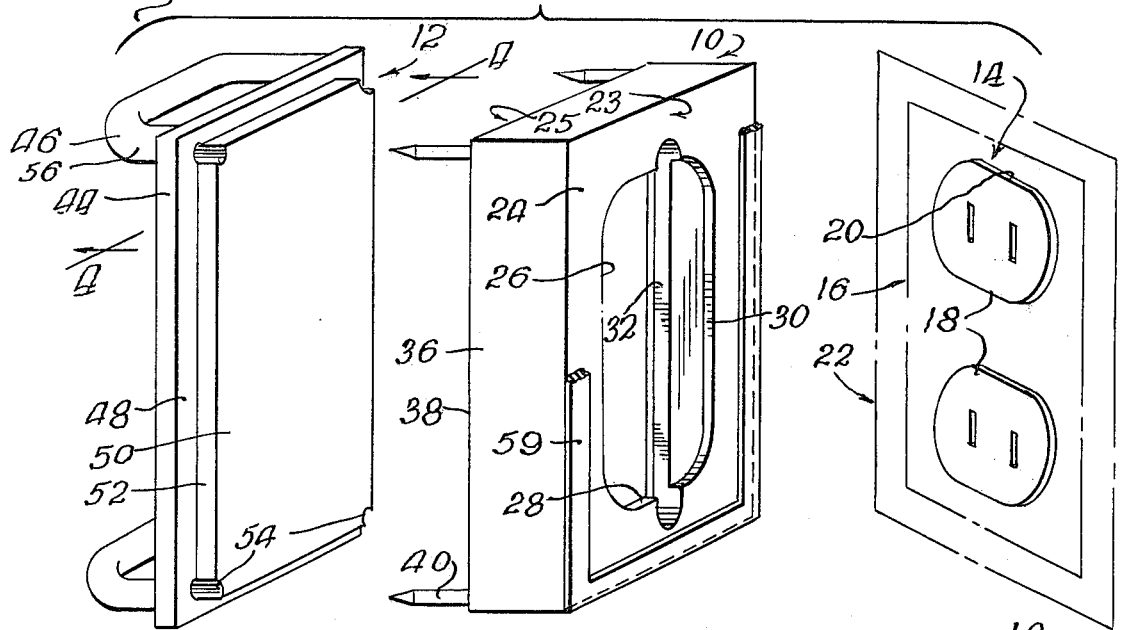
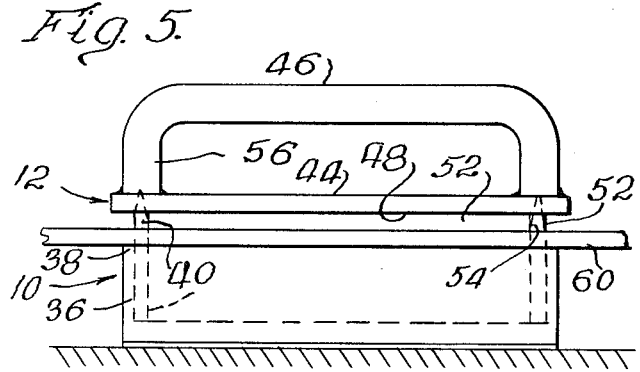
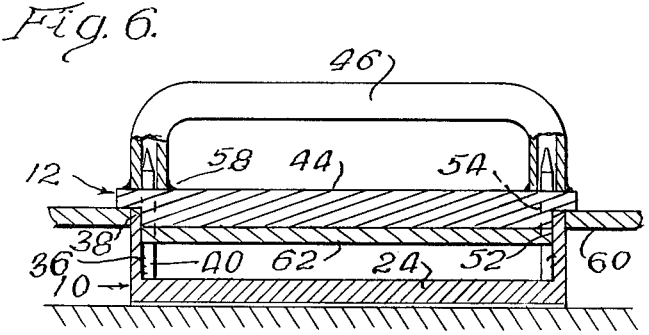
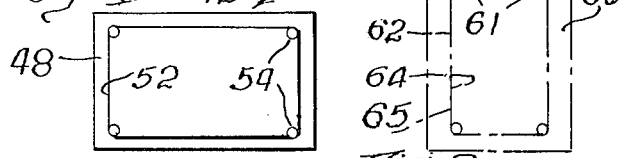
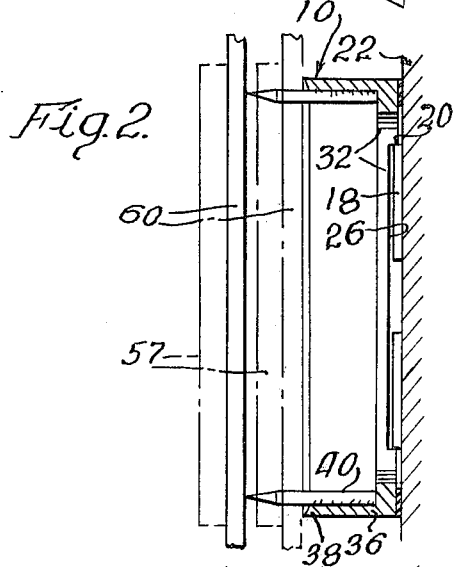
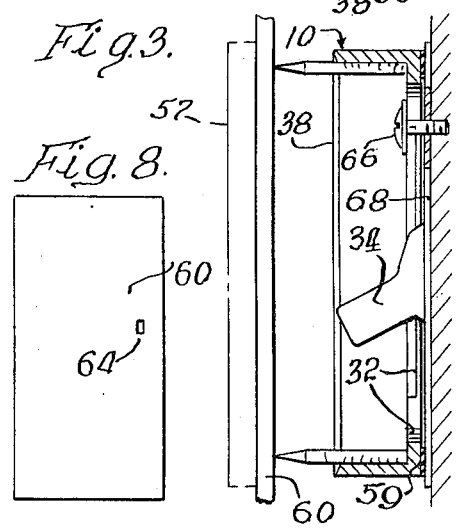
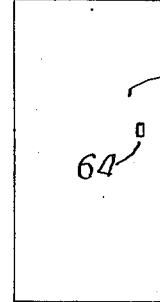

METHOD AND APPARATUS FOR CUTTING ELECTRICAL OUTLET OPENINGS IN PANELS

OBJECTS OF THE INVENTION

A broad object of the invention is to provide novel means and method of locating positions for holes in wall panels, and cutting those holes, for exposing outlets and switches that are in the walls to which the panels are applied.

Another broad object is to provide means and method of the foregoing character in the use of which the holes can be located with the utmost accuracy, and cut quickly and easily.

An additional object is to provide means of the foregoing character that is of extreme simplicity, and inexpensive, and easily carried by a tradesman, and handy to use by a homeowner, as well as being rugged and withstanding damage thereto, with the further advantage of eliminating the need for extraneous tools such as saws and cutting implements, and of all extraneous tools except a hammer.

The Field of the Invention

The invention resides in the field of refinishing walls, and specifically applying panels to the walls. In so applying panels to the walls, a difficulty has always existed in forming holes in the panels for exposing electrical outlets and switches therethrough. The difficulty resides in both locating the holes in the panels, and in actually forming the holes once they are located, at the intended spots on the panels. In the case of locating the holes, heretofore they were located in somewhat "hit or miss" fashion, of various kinds, such as by measuring the distance of the intended location vertically and laterally. This was laborious and time consuming, and moreover it was not always accurate. Additionally, once the intended locations of the holes were indicated, it was then necessary to cut the hole by such means as sawing it after first drilling starting holes, and this too was laborious and time consuming and also was not accurate.

The present invention is designed for overcoming those objections.

DESCRIPTION OF A PREFERRED EMBODIMENT

In the drawings

FIG. 1, is a perspective view of the device of the invention which includes two components, these components being shown in spaced relation, and in relation to an electrical outlet in a wall;

FIG. 2 is a vertical sectional view of the first component, or box, mounted on a wall in association with an outlet, and showing a wall panel applied thereto;

FIG. 3 is a view similar to FIG. 2 but showing the same first component in association with a switch, as opposed to a socket outlet;

FIG. 4 is a face view of the under side of the second component, or cutter plate, oriented according to line 4—4 of FIG. 1;

FIG. 5 is a view showing the two components of the device with a panel to be cut, lying on the floor;

FIG. 6 is a view similar to FIG. 5 but showing a further step in the cutting process;

FIG. 7 is a face view of a fragment of a panel showing small guide holes formed by the cutter box, and an outline of the main hole to be cut; and FIG. 8 is a face view of a panel in which a hole has been cut according to the present invention.

In the use of the device of the present invention, the items most often encountered in an operation of paneling a room, for which a hole must be made in the panels, are electrical outlets, and electrical switches. The device of the invention is designed for use with both of those instrumentalities, with a very minor change in the two instances, but, for convenience herein, both of those instrumentalities are included in the generic expression "outlets".

Referring first to FIG. 1, the device of the invention is made up of two components 10, 12, shown in perspective view in separated or exploded position, and both in association with an electrical outlet 14. The instrumentality or outlet 14 includes a main body portion 16 in which are socket elements 18. These socket elements 18 usually extend out from or project from the plane of the body portion 16 a short distance indicated by a ledge 20, which may be on the order of 1/16". The socket is disposed in a wall 22.

Referring again to the components 10, 12, the component 10 may be referred to as a back cutter, and for convenience, simply as a box, and the other component 12 as a cutter plate, which may also be referred to as a front plate or top plate.

Both components 10, 12 are preferably made of steel so as to provide the cutting effectiveness referred to again hereinbelow. For convenience the box 10 is referred to as having a rear side 23 and a front side 25, being so designated as oriented when the box is applied to the outlet in the wall. The box 10 includes a base or bottom element or floor 24 of suitable main thickness which is milled out in the rear side to form a central cavity 26 of a depth similar to the ledge 20 of the socket elements 18, or in the neighborhood of 1/16", or slightly more. This recess is of a shape to accommodate both of the socket elements 18, when the box is applied to the outlet. In accordance therewith the upper and lower edges of the recess may be generally straight as indicated at 28 to accommodate the corresponding straight edges of the socket elements, and elongated straight edges 30 at the sides to encompass both socket elements.

The base 24 of the box additionally has an elongated slot 32 cut entirely therethrough for receiving an actuating lever 34 (FIG. 3) of an electrical switch, when used in connection therewith, as referred to again hereinbelow.

The box 10 has a surrounding wall 36 defining a forwardly directed peripheral cutting edge 38.

A plurality of pointed pins 40 are mounted in the box in any suitable manner, such as by welding them to the surrounding wall 36 (FIG. 6).

The second component, or cutter plate, 12 is principally a single integral plate 44, but provided with guards or handles 46 referred to again hereinbelow. The plate 44 is milled out around the periphery as indicated at 48 forming a relatively thick main or body portion 50 which itself has a perpendicular surrounding wall 52. This wall 52 forms a shearing edge as will be referred to again hereinbelow.

The cutter plate 12 is provided with a plurality of holes 54 arranged in a pattern similar to that of the pins 40 for receiving those pins. Those holes, in this pattern, project partially into the thick body portion 50, and extend through the cutter plate.

The guards or handles 46 may be in the form of tubes or pipes, of generally U-shape, with relatively short legs 56 (FIG. 6) and secured to the top or front surface of the cutter plate over the holes 54. They may be secured to the cutter plate in any suitable manner, such as by welding as indicated at 58. These guards 46 will be referred to again hereinbelow.

The cutter plate 12 and box 10 are complementally sized and shaped, so that the shearing edge 52 coacts with the cutting edge 38, for performing the cutting operation on the panel, as referred to below.

A cushioning element 59 is preferably applied to the rear side of the base of the box, this cushioning element being of such material as rubber, and extending around the periphery of the box.

In the use of the device, the box 10 is applied to the wall 22 (FIG. 2) in association with the outlet wherein the socket elements 18 are received in the recess 26. The recess is preferably shaped so as to receive the socket elements in a snug fit, and the box is held in position by resting it on the ledge 20 of the top socket element 18, as shown in FIG. 2. As the next step, a panel 60 which was theretofore cut as to size for applying in position over the outlet, and in which the hole is to be cut because of that outlet, is then applied to its intended position against the box 10. It is fitted against the pins 40, and then tapped lightly as by a hammer which drives it onto the pins, the pins penetrating through the panel. A wood block 57 may be placed against the panel, in this step, to protect the hands from the pins. The cushioning element 59 engages the outlet structure around the socket elements 18 and cushions the effect of the tapping of the panel into place. FIG. 2 shows, in dot-dash lines, the position of the panel and cutter plate after this step.

As the next step, the panel is removed from the upright position, and this carries the box 10 with it. The pins form guide holes 61 (FIG. 7) in the previously perforate panel, and are friction-held therein, and the box is thereby carried with the panel. The panel, with the box carried thereby, is laid on the floor as represented in FIG. 5 and then the cutter plate 12 is applied. This is done by the simple step of fitting it to the pins 40 so that the pins enter through the holes 54, and then it is dropped onto the panel. The user then strikes the cutter plate with a hammer, and drives it down against the panel. The body portion 50 of the cutter plate, through its shearing edge 48, coacts with the cutting edge 38 and cuts or shears the portion of the panel within the surrounding wall 36, from the remainder of the panel, and forms a cut-out 62, leaving a hole 64 in the panel. FIG. 6 shows the position of the various elements following this step. The body of the panel 60 is not moved in this step any substantial amount from its upper position, although it may be incidentally moved somewhat in the forcing of the cut-out 62 downwardly. FIG. 7 shows the small guide holes 61 which are formed by the pins. The dot-dash rectangular outline 65 designates where the main hole 64 is made.

After this step, the cutter plate 12 is removed, by gripping the guards 46 and pulling upwardly on them. Thereafter, the box is removed from the panel in any suitable manner, such as by tapping against the insert 62 with a hammer, this action, upon the insert reaching the bottom of the box, forcing the box out of the hole 64 in the panel. The box is without any extraneous protuberances around its periphery, so that it can be forced in the opposite direction, or forwardly from the panel, instead, if desired, for removing it. The insert 62 can then be easily removed from the box by a screw driver, or even by the fingers. FIG. 8 shows the panel 60 with the hole 64 thus formed therein. The guards 46, referred to above, in fitting over the extended ends of the pins 40, guard the pins against damage as may otherwise occur from using the hammer, and they guard the user's hands against injury from the pins. Additionally, as stated, these guards are convenient for gripping them for removing the cutter plate from its finally assumed position in the cutting step.

Referring again to FIG. 3 in applying the box 10 to an electrical switch, the actuating lever 34 of the switch is extended through the slot 32 as referred to above, and the box may be held in place in its case by utilizing a screw or bolt 66 extended through the slot 32 and threaded into an element 68 of the switch structure. In this case when the box is held mechanically on the switch structure by the screw, after the wood panel 60 has been marked against the box, the wood panel may be removed while leaving the box mounted on the wall and thereafter the screw 66 is removed and the box lifted off the wall. The box is then fitted to the panel by fitting the pins 40 into the small guide holes 61 thus formed in the panel, which of course are readily visible, and then the panel with the box again mounted thereon, is laid down as represented in FIG. 5 and the succeeding steps referred to above are performed.

The main hole 64 cut in the panel is clean cut. The pins 40 are contained within the surrounding wall 36, and therefore within the peripheral cutting edge 38, and the hole formed in the panel is accurate according to the shape of the surrounding wall, and the guide holes 61 reside in the cut-away insert 62 (FIG. 7), which is scrap.

The use of the invention enables absolute accuracy in locating the positions of the holes to be formed, and then in cutting the holes at those positions. The holes are accurate in shape. The entire operation can be performed in a matter of a few minutes, such as 5-10 minutes. The actual cutting step of cutting the insert 62 away, is accomplished by 6-8 raps of the hammer which of course requires a very minimum of time.

The device may be used regardless of the location of the outlets to be accommodated, whether low near the floor, or in raised position for manipulating by the hand, or of course in any other position. The entire operation can be performed by a non-skilled person, and there is no requirement for extraneous tools or instrumentalities, except a hammer. This is of particular note when it is considered that it eliminates the necessity of such things as coping saws, keyhole saws, wood chisels, drills for forming starting holes for the saws, etc.

I claim:

1. A method of marking locations for, and forming, holes in panels applied to walls in which electrical outlets are mounted, for the electrical outlets to be exposed through the holes, comprising the steps,
    (a) placing a first cutting component having a peripheral shape complementary to the outlet on an outlet in a wall,
    (b) placing a panel against the first cutting component,
    (c) placing a second cutting component against the panel in register with the first cutting component, and (d) forcing the second cutting component against the first cutting component and thereby cutting a hole in the panel.

2. A method according to claim 1 and including the steps, (e) effecting the temporary securement of the first cutting component to the panel, in step (b), and (f) removing the panel away from the wall and the panel thereby carrying the first cutting component therewith, and thereafter carrying out steps (c) and (d).

3. A method according to claim 2 and including the step, (g) projecting elements of the first cutting component through the panel, in carrying out step (b), and (h) manipulating said second cutting component so as to engage said projecting elements therewith, and thereby guiding the second cutting component into register with the first cutting component.

4. A device for locating and forming a hole in a wall panel for exposing therethrough of an electrical outlet that is mounted in the wall to which the panel is to be applied, comprising, two components, a box and a cutter plate, the box having a peripheral shape complementary to that of the outlet, the box including a bottom element at a rear side and a surrounding wall with a cutting edge directed forwardly, the box being adapted to be fitted to the wall with the bottom element directed to the outlet and the bottom element and outlet together having interacting elements operable for mounting the box on the outlet, the box having pins extending forwardly of said cutting edge, the cutter plate having a peripheral shape complementary to the box, and having a shearing element complementary in shape to the cutting edge of the box, the panel being adapted to be fitted to the wall against the box when the latter is mounted on the outlet, and be struck when in that position, whereby in response to such strike the pins penetrate the panel, the panel being thereupon removable from its thus fitted position, and with the box fitted to the panel with the pins projecting through the panel, and the cutter plate being adapted to be applied to the panel on the side opposite the box in register with the box as guided by the pins, and the shearing elements of the cutter plate in response to the cutter plate being struck, is operable in conjunction with the cutting edge of the box for cutting from the panel, a piece the size and shape of said cutting and shearing edges.

5. A device according to claim 4 wherein, the interacting elements on the outlet and box include a projection in the outlet and a recess in the bottom element receiving the projection, enabling the box to be demounted from the outlet merely by a pulling force, and the pins, in response to penetrating through the panel, produce a friction effect holding the box on the panel, enabling removal of the box from the outlet by removal of the panel.

6. A device according to claim 4 wherein, the box has an opening therethrough for receiving an actuating lever of a switch that constitutes the outlet, and means is provided for removably securing the box to the outlet, whereby following removal of the panel from its position, the box remains in place mounted on the switch, and thereafter enabling removal of the box from the outlet and fitted to the panel with the pins again fitted in the holes they made in penetrating through the panel.

7. A device according to claim 4 wherein, the pins are positioned within the surrounding wall at the corners thereof.

8. A device according to claim 7 wherein, the cover plate includes guards secured thereto, having openings therein receiving the ends of said pins and enclosing them, when the cover plate is applied to the panel and box, and the guards serve as grippers for facilitating manually removing the cover plate from the box after the step of cutting the panel.

9. A device according to claim 4 wherein, the box is provided with a peripheral cushioning element on its rear side engageable with the corresponding portion of the outlet, laterally outwardly of the main functioning portions of the outlet.

* * * * *